United States Patent
Makino et al.

(10) Patent No.: US 7,684,573 B2
(45) Date of Patent: Mar. 23, 2010

(54) SIGNAL LEVEL ADJUSTMENT APPARATUS AND CONTROL METHOD FOR THE ADJUSTMENT APPARATUS

(75) Inventors: Takaaki Makino, Hamamatsu (JP); Takuya Yamamoto, Osaka (JP)

(73) Assignee: Yamaha Corporation, Hamamatsu-shi (JP)

( * ) Notice: Subject to any disclaimer, the term of this patent is extended or adjusted under 35 U.S.C. 154(b) by 1325 days.

(21) Appl. No.: 11/123,730

(22) Filed: May 6, 2005

(65) Prior Publication Data

US 2005/0249364 A1    Nov. 10, 2005

(30) Foreign Application Priority Data

May 7, 2004  (JP) .............................. 2004-139253
May 7, 2004  (JP) .............................. 2004-139254

(51) Int. Cl.
H04B 1/00 (2006.01)
(52) U.S. Cl. .................................................. 381/119
(58) Field of Classification Search ................. 381/119, 381/118, 61, 107, 109
See application file for complete search history.

(56) References Cited

U.S. PATENT DOCUMENTS

| | | | |
|---|---|---|---|
| 4,947,440 A * | 8/1990 | Bateman et al. ............. | 381/119 |
| 5,054,077 A | 10/1991 | Suzuki | |
| 5,177,801 A | 1/1993 | Shoda et al. | |
| 5,239,458 A | 8/1993 | Suzuki | |
| 5,317,641 A | 5/1994 | Yasuda et al. | |

| | | | |
|---|---|---|---|
| 2001/0055401 A1 | 12/2001 | Yamada et al. | |

FOREIGN PATENT DOCUMENTS

| | | |
|---|---|---|
| JP | 7312022 | 11/1995 |
| JP | 2004-112525 | 4/2004 |

OTHER PUBLICATIONS

Chinese Office Action mailed Dec. 26, 2008, for Chinese Patent Application 200510068353.6, 13 pages (including English Translation.).
Digital Production Console, DM 2000 Owner's Manual, Yamaha Corporation, Japan.

* cited by examiner

*Primary Examiner*—Ping Lee
(74) *Attorney, Agent, or Firm*—Morrison & Foerster LLP

(57) ABSTRACT

Fader operators operable manually and automatically are provided in corresponding relation to a plurality of channels. For each of the channels, a setting section can set a fade operation mode of the channel to either a first mode where a fade is enabled or a second mode where the fade is disabled. Upon receipt of a crossfade execution instruction, a corresponding fader operator is automatically operated in such a manner that each channel set in the first mode is faded in or faded out. When the fade operation mode of a given channel, which is undergoing a fade process, has been changed to the second mode, the fade process for the given channel is ceased, and the corresponding operator is changed to a predetermined operating state, e.g., state immediately before the start of the crossfade. According to another example, when a crossfade cease instruction has been given (e.g., by manual operation of the fader operator) for a particular channel which is undergoing a fade process, the process for the particular channel is ceased with the operator for the particular channel kept in the current operating state.

4 Claims, 8 Drawing Sheets

SETTING INFORMATION TABLE

| CHANNEL | 1 | 2 | 3 | 4 | 5 | 6 | 7 | 8 | 9 | 10 | 11 | 12 |
|---|---|---|---|---|---|---|---|---|---|---|---|---|
| A(VTR106) | X | X | X | X | | | | | | | | |
| B(VTR108) | | | | | X | X | X | X | | | | |
| C | | | | | | | | | | | | |
| FADER | ON | ON | ON | ON | ON | OFF | ON | ON | ON | ON | ON | ON |
| CROSSFADE | FROM | FROM | FROM | NONE | TO | TO | TO | NONE | NONE | NONE | FROM | TO |
| AUTO | ON | OFF | ON | ON | ON | ON | ON | ON | ON | ON | ON | ON |
| REFERENCE LEVEL | -10 | -10 | -10 | -10 | -20 | -20 | -20 | -20 | 0 | 0 | 0 | 0 |

FIG. 4

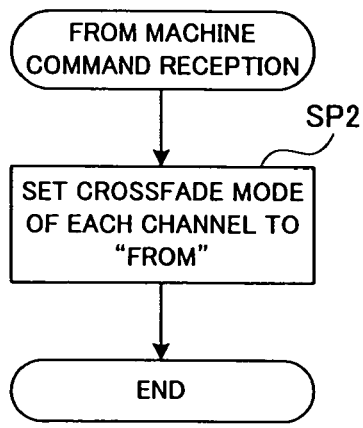
F I G. 5 A
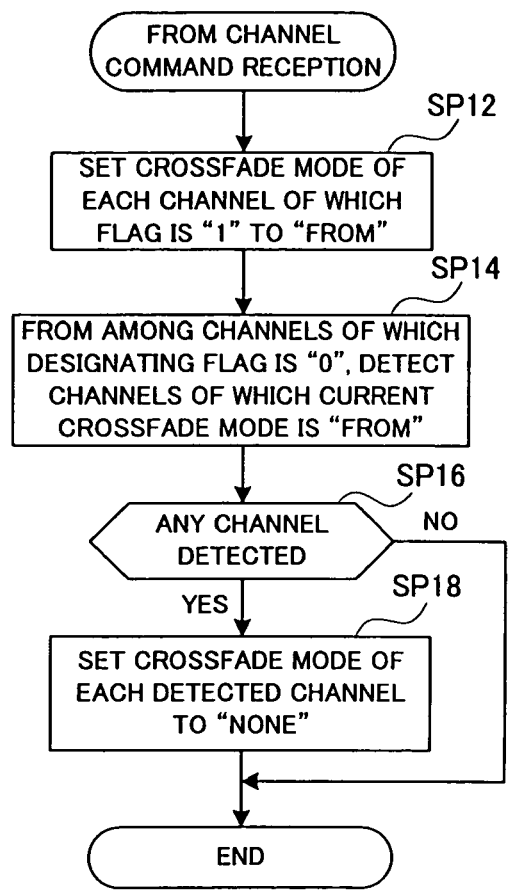
F I G. 5 B
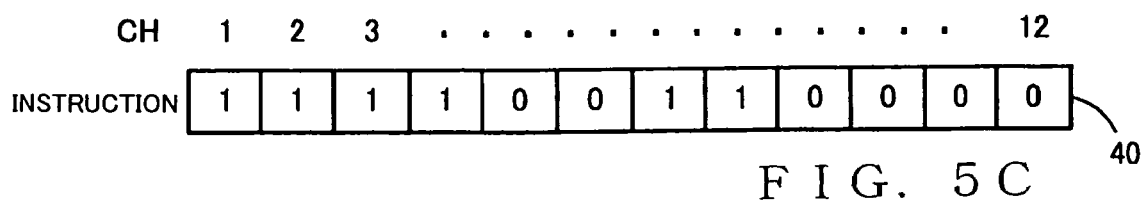
F I G. 5 C

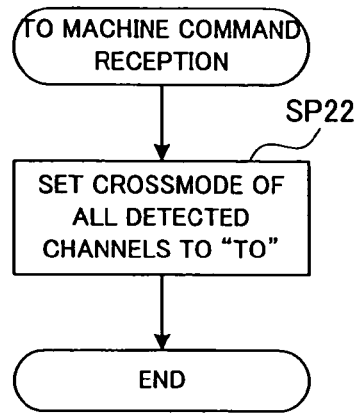
F I G. 6 A
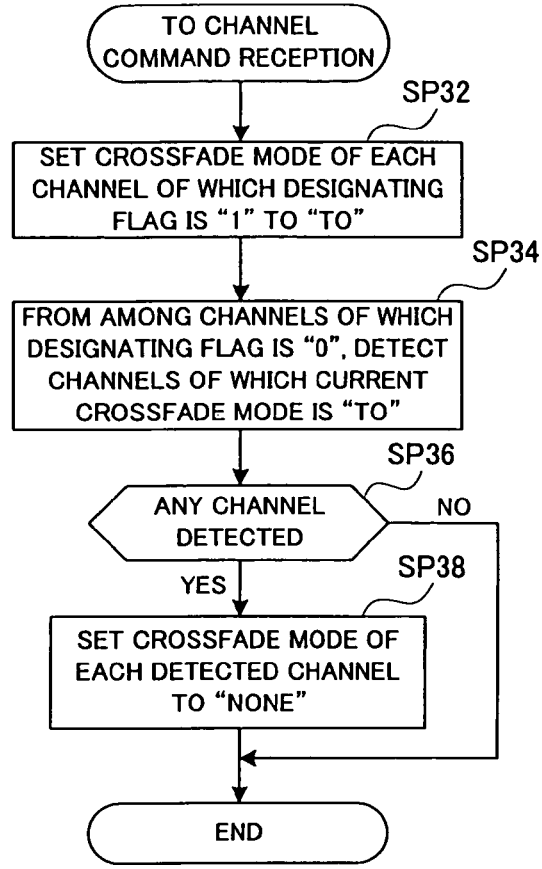
F I G. 6 B
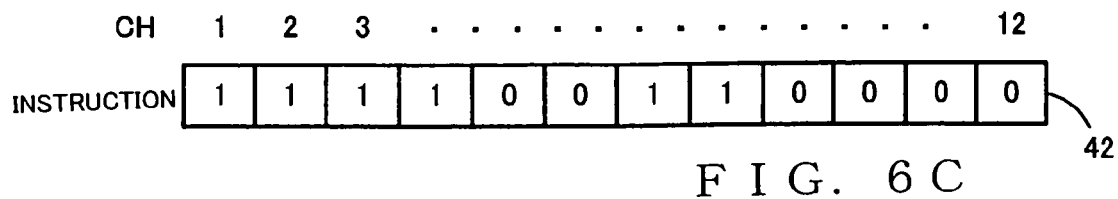
F I G. 6 C

SIGNAL LEVEL ADJUSTMENT APPARATUS AND CONTROL METHOD FOR THE ADJUSTMENT APPARATUS

BACKGROUND OF THE INVENTION

The present invention relates to signal level adjustment apparatus and control methods therefor which are suitable for use in production of video/audio content, as well as computer programs related to such signal level adjustment. For example, the present invention concerns a mixer, video switcher or the like for processing audio signals and/or video signals.

For production of video/audio content, it is necessary to manipulate a great number of devices, such as a plurality of video tape recorders for reproducing video/audio signals as video/audio materials (i.e., material video/audio signals) or recording finished or completed content, a digital mixer for mixing audio signals and a video switcher for switching between video signals. Because it is very troublesome for a human operator to individually operate these devices, there has been known a technique that uses a control apparatus for remote-controlling the various devices in a centralized manner. Namely, with this known technique, the human operator can operate the various devices by mainly manipulating the control apparatus alone, so that the human operator can appropriately carry on the content production as desired.

When switching between material audio signals of two channels is to be made, a crossfade process is generally performed for fading-in the audio signal of one of the channels while fading-out the audio signal of the other channel. The above-mentioned control apparatus can also instruct a digital mixer to perform the crossfade process. Namely, once the human operator performs predetermined operation on the control apparatus, a command instructing a cross-face process (i.e., crossfade execution instruction) is transmitted from the control apparatus to the digital mixer. Upon receipt of the crossfade-instructing command, the digital mixer carries out the instructed crossfade process on the basis of prestored crossfade setting information. Namely, audio signals of a group of input channels are faded out while audio signals of another group of input channels are faded in. During that time, faders corresponding to the various channels are automatically driven in an upward/downward direction on an operation panel of the digital mixer. Such a digital mixer that can be remote-controlled from outside is disclosed, for example, in "DM2000 Instruction Manual", published by Yamaha Corporation in February, 2002.

However, when a crossfade has been instructed from the control apparatus, the above-discussed technique can not cease the crossfade only for a certain one or ones of the channels via the operation panel of the digital mixer. Further, when the human operator desires to cease the crossfade for only a certain one or ones of the channels, he or she may, in some cases, want the corresponding faders to be restored to their respective states or positions before execution of the crossfade, or, in other cases, want the corresponding faders to be stopped at desired positions after the start of the crossfade execution. In addition, it has not been possible for the user to ascertain, near the faders, the channels to be faded in and to be faded out in the crossfade process.

SUMMARY OF THE INVENTION

In view of the foregoing, it is an object of the present invention to provide a signal level adjustment apparatus and control method therefor which allow a crossfade process to be ceased along the way only for a certain one or ones of a plurality of channels, as well as a computer program related to the signal level adjustment.

It is another object of the present invention to provide a technique for allowing the crossfade process to be ceased in a variety of different styles or manners.

It is still another object of the present invention to provide a technique for allowing various styles of the crossfade process to be ascertained with ease.

According to a first aspect of the present invention, there is provided an improved signal level adjustment apparatus, which comprises: at least two level adjusting operators each operable manually or automatically to adjust a signal level of any one of at least two channels; a setting section that, for each of the channels, sets a fade operation mode of the channel to either a first mode where a fade is enabled or a second mode where the fade is disabled; a crossfade execution section that, upon receipt of a crossfade execution instruction, automatically operates a corresponding one of the operators in such a manner that the signal level is faded in or faded out for each channel set in the first mode from among the at least two channels; and a change section that, when the fade operation mode for any one of the channels has been changed to the second mode while a fade-in or fade-out process is being executed for the one channel by the crossfade execution section, ceases the fade-in or fade-out process for the one channel and changes an operating position or state of the operator for the one channel to a predetermined state.

In the present invention, the fade operation mode of each of the channels can be set, via the setting section, to either the first mode where the fade is enabled or the second mode where the fade is disabled. By the setting section changing the fade operation mode from the first mode (i.e., fader-ON mode) to the second mode (i.e., fader-OFF mode) while the fade-in or fade-out process is being executed for a desired one of the channels, the crossfade process being executed for the desired channel can be ceased along its way. In this case, if the fade operation mode for a given channel has been set to the second mode (i.e., fader-OFF mode), no fade operation is executed for the given channel even when a new crossfade execution instruction is received later. If the fade operation mode for the given channel has been changed from the second mode to the first mode (i.e., fader-ON mode), then the fade-in or fade-on process will be carried out in response to reception of a subsequent, new crossfade execution instruction.

For example, the above-mentioned "predetermined state" is an operating position or state of the operator immediately before the start of the fade-in or fade-out process. When the change section has ceased the fade-in or fade-out process, the change section restores the operating state of the operator for the channel in question to the operating state of the operator immediately before the start of the fade-in or fade-out process.

The signal level adjustment apparatus of the present invention may further comprise an information presentation section that, for each of the channels, presents crossfade mode information indicating which one of the fade-in and fade-out is to be executed; and an informing device that informs or indicates the fade operation mode and crossfade mode information of each of the channels. Thus, the user can readily ascertain and distinguish the channel to be faded in and the channel to be faded out. Further, with the informing device positioned in association with the operators, such as faders, of the individual channels, the user can appropriately ascertain the channels to be faded in and faded out, with an even enhanced ease.

According to another aspect of the present invention, there is provided an improved signal level adjustment apparatus, which comprises: a plurality of level adjusting operators each operable manually or automatically to adjust a signal level of any one of a plurality of channels; a crossfade execution section that, upon receipt of a crossfade execution instruction, automatically operates a corresponding one of the operators in such a manner that the signal level of one of at least two channels among the plurality of channels is faded in and the signal level of other of the at least two channels is faded out; a detection section that detects whether a predetermined crossfade cease instruction has been given for any one of the channels while a fade-in or fade-out process is being executed for the one channel by the crossfade execution section; and a cease control section that, when the crossfade cease instruction for the one channel has been detected by the detection section, ceases the fade-in or fade-out process for the one channel while keeping the operator for the one channel in a current operating state.

In the present invention, by giving a predetermined crossfade cease instruction for any one of the channels while the fade-in or fade-out process is being executed for that channel by the crossfade execution section, it is possible to cease the fade-in or fade-out process for the channel along the way; in this case, the operator for the one channel is kept in the current operating state at the time point when the crossfade cease instruction has been detected. Further, after the crossfade process is ceased in response to the predetermined crossfade cease instruction, the channel in question can resume the fade-in or fade-out process upon receipt of a new crossfade execution instruction.

For example, in the signal level adjustment apparatus of the invention, the detection section detects that the predetermined crossfade cease instruction has been given, on the basis of a detection of manual operation of the operator for the one channel while the fade-in or fade-out process is being executed for the one channel by the crossfade execution section, and the operator for the one channel is shifted from the current operating state, where the operator has been kept by the cease control section, to an operating state corresponding to the manual operation of the operator.

Further, into the above-described arrangements of the present invention, there may be combined a construction for allowing a predetermined crossfade inhibition instruction to be independently given to any desired one of the channels. The predetermined crossfade inhibition instruction corresponds to the above-mentioned second mode (fader-OFF mode) of the fade operation mode. Namely, the crossfade execution section may be arranged as follows. Namely, concerning any one of the channels for which the predetermined crossfade cease instruction has been given, the crossfade execution section executes the fade-in or fade-out process when a new crossfade execution instruction is given later. But, concerning any one of the channels for which the predetermined crossfade inhibition instruction has been given, the crossfade execution section does not execute the fade-in or fade-out process even when a crossfade execution instruction is given, until the crossfade inhibition is canceled later. Namely, with the inventive arrangements capable of both the crossfade cease operation and the crossfade inhibition operation, whether or not an operating amount of a corresponding tone volume operator should be set to a predetermined reference operating amount can be selected by the user selecting any one of the crossfade cease operation and crossfade inhibition operation, with the result that the present invention can cease the crossfade process in any of a variety of different manners.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 4 is a diagram showing a data structure of a setting information table employed in the embodiment;

FIG. 5A is a flow chart of a FROM machine command reception routine performed in the embodiment;

FIG. 5B is a flow chart of a FROM channel command reception routine performed in the embodiment;

FIG. 5C is a diagram showing an example of channel designating data included in the FROM channel command;

FIG. 6A is a flow chart of a TO machine command reception routine performed in the embodiment;

FIG. 6B is a flow chart of a TO channel command reception routine performed in the embodiment;

FIG. 6C is a diagram showing an example of channel designating data included in the TO channel command;

DETAILED DESCRIPTION OF THE INVENTION

Figure 1:
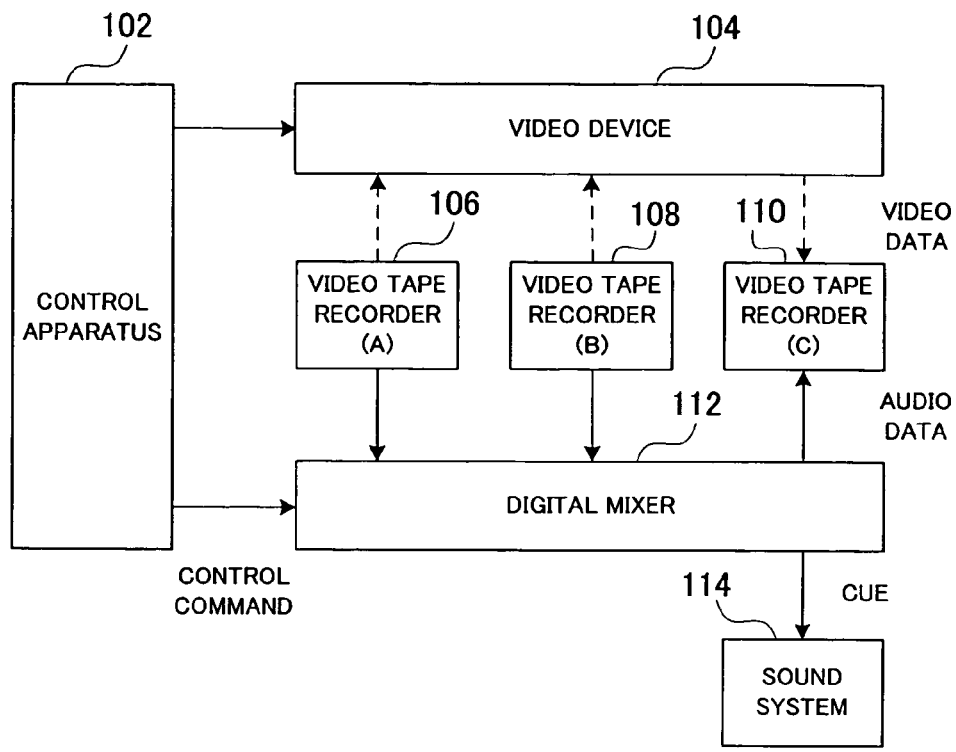
FIG. 1 is a block diagram showing a general setup of an editing system to which is applied a digital mixer according to an embodiment of the present invention.

1. Setup of Embodiment:
 1.1 General Setup:
 With reference to FIG. 1, a description will now be given about a setup of an editing system to which is applied a digital mixer according to an embodiment of the present invention. In the figure, reference numerals 106, 108 and 110 represent video tape recorders, of which the video tape recorders 106 and 108 reproduce video/audio signals that are materials for producing content. The video tape recorder 110 records video/audio signals of completed content. Each of the video tape recorders 106, 108 and 110 is capable of recording and reproducing audio signals of a multiplicity of tracks. Further, 104 represents a video device that comprises a video switcher, video effector, etc., and the video device 104 performs effect impartment, mixing, switching and other processes on video signals reproduced via the video tape recorders 106 and 108. The thus-processed video signals are supplied from the video device 104 to the video tape recorder 110.

The digital mixer 112 of the present invention performs effect processing, level adjustment processing, etc. on audio signals supplied from the video tape recorders 106 and 108, and it supplies the thus-processed audio signals to the video tape recorder 110. Control apparatus 102 remote-controls a plurality of devices, such as the video tape recorders 106, 108 and 110 and digital mixer 112, to operate in appropriately timed relation to one another, and the control apparatus 102 transmits, to each of the to-be-controlled devices, an instruction (i.e., control command), indicative of specific control (i.e., process to be performed by the device), in accordance with predetermined control timing specific to the device (i.e., at timing when the device should perform the instructed process). Upon receipt of such a control command from the control apparatus 102, each of the to-be-controlled devices (such as the video tape recorders 106, 108 and 110 and digital mixer 112) carries out the process indicated by the control command. Sound system 114 audibly generates or sounds each CUE signal (monitoring signal) output from the digital mixer 112.

Figure 2:
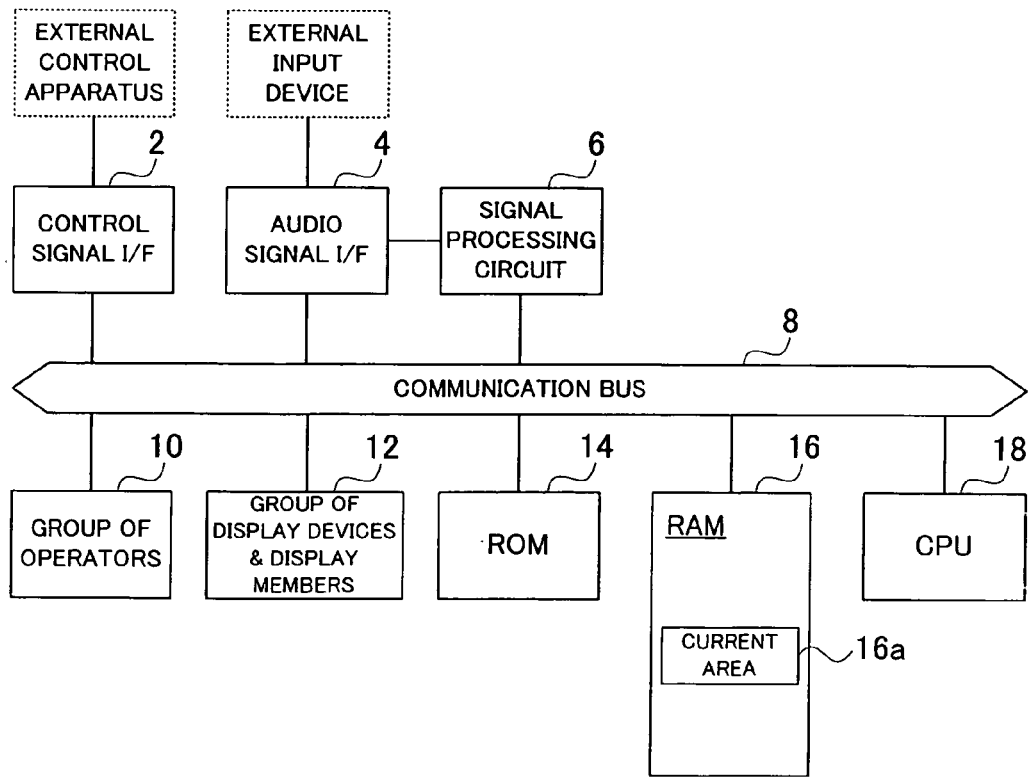
FIG. 2 is a block diagram showing a detailed construction of the embodiment of the digital mixer.

1.2. Construction of the Digital Mixer 112:

Next, a detailed construction of the digital mixer 112 will be set forth, with reference to FIG. 2. In the figure, reference numeral 2 represents a control signal interface (I/F), via which control signals, such as the above-mentioned commands, are input and output from and to (i.e., communicated with) the control apparatus 102. Audio signal interface (I/IF) 4 communicates audio signals with input/output devices, such as the video tape recorders 106, 108 and 110. Signal processing circuit 6, which comprises a group of DSPs (Digital Signal Processors), performs mixing processing and effect processing on digital audio signals supplied via the audio signal interface 4 and outputs the processed results to the audio signal interface 4.

Further, in the figure, reference numeral 10 represents a group of operators, which includes faders, volume control operators, switches, character-entering keyboard, mouse, etc. Group of display devices and display members 12 includes a flat panel display (e.g., LCD), LEDs provided around the volume control operators, LEDs embedded or built in the switches and the like, level meters, etc. Reference numeral 18 represents a CPU, which controls various components, via a bus 8, on the basis of control programs stored in a ROM 14. RAM 16 is used as a working memory for the CPU 18 and for various other purposes.

Further, the RAM 16 includes a current area 16a, which is provided for storing currently-set values of individual parameters to be used for signal processing by the signal processing circuit 6. For example, in the current area 16a, there are stored fader gains (i.e., values for controlling tone volumes) to be applied to audio signals of input/output channels on the basis of operating amounts of the individual faders, equalizing parameters of the input/output channels, ON/OFF states of various switches, etc. Signal processing to be performed by the signal processing circuit 6 on audio signals is controlled on the basis of the values stored in the current area 16a.

Figure 3:
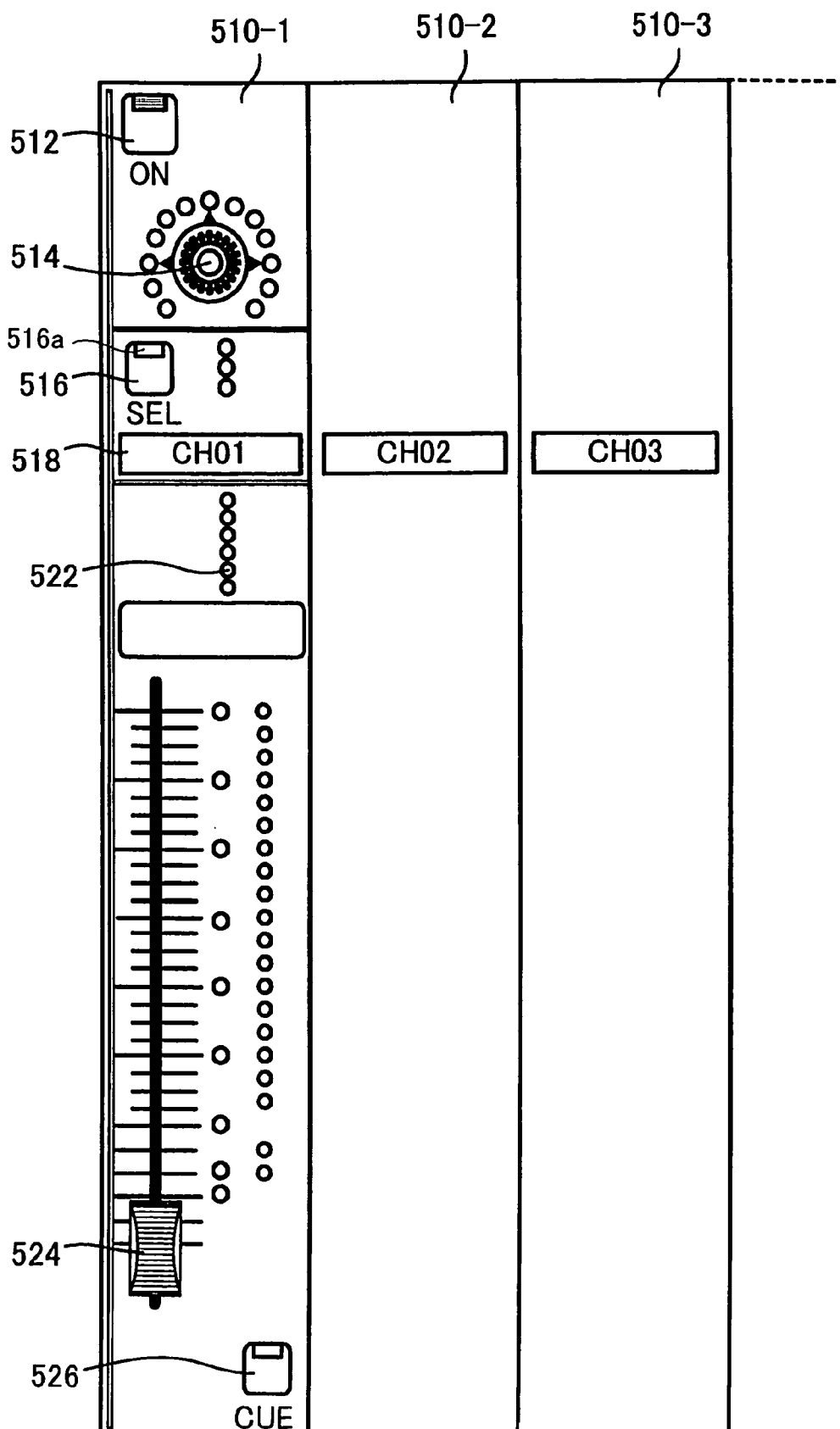
FIG. 3 is a plan view showing principal portions of an operation panel employed in the embodiment of the digital mixer

1.3. Construction of Principal sections of the Operation Panel:

The following paragraphs describe a detailed construction of principal sections of the operation panel (group of operators 10) employed in the digital mixer 112, with reference to FIG. 3.

In the figure, reference numerals 510-1, 510-2, . . . represent channel strips that are provided in corresponding relation to the input channels. The channel strips 510-1, 510-2, . . . are constructed in the same manner, and thus the following paragraphs representatively describe a detailed construction of one of the channel strips 510-1.

In the channel strip 510-1, an ON key 512 switches between ON and OFF states of the corresponding input channel, and the ON key 512 has an LED built therein that is illuminated (i.e., turned on) or deilluminated (i.e., turned off) in response to an ON/OFF state of the key 512. Rotary encoder 514 is used for panning adjustment and gain adjustment of the corresponding input channel, and a plurality of LEDs are disposed around the rotary encoder 514 in a substantial annual configuration. Operating amount of the rotary encoder 514 is displayed by an illumination state of the LEDs. SEL key 516 switches between ON and OFF states of a later-described FADER mode. The SEL key 516 has built therein a plurality of LEDs of different illumination colors, and illumination/deillumination states of these LEDs 516a can be set independently of each other.

Display 518 displays the name of the corresponding input channel. Electric fader 524 includes a detector for detecting manual operation thereof by the human operator. When human operator's manual operation of the fader 524 has been detected by the detector, the fader 524 detects an operating amount (level) of the fader 524 having been achieved by the manual operation and then adjusts the fader gain of the corresponding input channel in accordance with the detected level. Operating amounts of the rotary encoder 514 and electric fader 524 can be automatically set on the basis of instructions by the CPU 18. CUE key 526 switches between ON and OFF states of the CUE function of the corresponding input channel. Audio signal of each input channel, for which the CUE function is ON, is mixed with a CUE signal. Namely, a result of mixing between audio signals of one or more input channels becomes a CUE signal that is audibly generated via the sound system 114.

2. Data Structure in the Embodiment:

Setting information table 30 of FIG. 4 is stored in advance in the RAM 16 of the digital mixer 112. In the figure, reference numeral 32 represents a "channel number section" in which are indicated the unique numbers of the input channels in the digital mixer 112, and 34 represents an "input device allocation section". The input device allocation section 34 defines which input channels input audio signals of a plurality of input devices A. B, C, . . . are allocated to. Those input channels, to which the input devices are allocated, are indicated by marks "X". Whereas the input devices A. B, C, . . . may be any desired devices, the illustrated example of FIG. 4 assumes that the input device A is the video tape recorder 106 and the input device B is the video tape recorder 108. More specifically, in the illustrated example of FIG. 4, four input signals from the input device A (video tape recorder 106) are allocated to the first to fourth input channels, and four input signals from the input device B (video tape recorder 108) are allocated to the fifth to eighth input channels. The allocation state in the input device allocation section 34 is set by the human operator using some of the operators of the digital mixer 112.

"FADER mode designation section" 35 designates, for each of the input channels, "FADER MODE ON" or "FADER MODE OFF" as an FADER mode setting. Here, the "FADER mode" designates, for each of the input channels, whether or not the internal elements in the channel strip 510-1, 510-2, . . . of the input channel can be remote-controlled on the basis of a control command from the control apparatus 102. Namely, if the FADER mode is "ON" (i.e., FADER MODE ON), the fader etc. of the input channel are placed in a state where they are remote-controllable on the basis of a control command from the control apparatus 102, while, if the FADER mode is "OFF" (i.e., FADER MODE OFF), the fader etc. of the input channel are placed in a state where they are not remote-controllable on the basis of a control command from the control apparatus 102. The setting of the FADER mode can be set by the human operator using the SEL key 516 of the digital mixer 112.

"CROSSFADE mode designation section" 36 stores, for each of the input channels, "FROM", "TO" or "NONE" as a CROSSFADE mode setting. Here, "FROM" means that the audio signal of the channel is to be faded out in a crossfade process, "TO" means that the audio signal of the channel is to be faded in a crossfade process, and "NONE" means that the audio signal of the channel is to be neither faded in nor faded out. However, even when the CROSSFADER mode is "NONE", the other components than the fader in the channel strip are remote-controlled as along as the FADER mode is "ON", and thus, the ON/OFF state of the CUE key 526 etc. can be remote-controlled from the control apparatus 102. The setting of the CROSSFADE mode can be made only in accordance with the control command received from the control apparatus 102; it can never be set using any operator of the digital mixer 112.

"AUTO mode designation section" 37 designates, for each of the input channels, "AUTO MODE ON" or "AUTO MODE OFF" as an AUTO mode setting. Here, the "AUTO mode" is a mode for defining, for each of the input channels, whether the fader of the input channel is to be actually automatically driven during a currently-performed crossfade process. Namely, if the AUTO mode is "ON" (i.e., "AUTO MODE ON"), the fader of the input channel is automatically driven, while, if the AUTO mode is "OFF" (i.e., AUTO MODE OFF), the fader of the input channel is not automatically driven. In initiating a crossfade process, the AUTO mode of every input channel of which the CROSSFADE mode is "FROM" or "TO" is set to "ON" (i.e., "AUTO MODE ON"). However, once the human operator performs predetermined operation during the course of the crossfade, the input channel corresponding to the human operator's operation is set to "AUTO MODE OFF".

38 represents a "reference level designation section", which defines a crossfade reference level. Here, the "reference level" is used as a fader gain at the start of the crossfade in the case of the input channel whose CROSSFADE mode is "FROM", but used as a fader gain at the end of the crossfade in the case of the input channel whose CROSSFADE mode is "TO".

3. Behavior of the Embodiment:

3.1. General Behavior of the Digital Mixer:

Once any one of the operators 10 is operated by the human operator, the operation is detected by the CPU 18, and a corresponding parameter stored in the current area 16a is updated in accordance with the detected operation. Even when none of the operators 10 has been operated by the human operator, the stored contents of the current area 16a are, in some cases, updated through processes to be later described. Interrupt process is carried out in the CPU 18 on a periodical basis. In the interrupt process, respective operating amounts of the operators 10 and corresponding parameters in the current area 16a are compared, and, if the operating amount of any of the operators 10 is different from the value of the corresponding parameter in the current area 16a, it is updated to confirm to the parameter value. Namely, the operating amounts of the individual operators are updated to keep up coincidence with the corresponding parameter values.

For example, the operating amount of the rotary encoder 514, which is represented by the illumination state of the LEDs disposed therearound, can be updated instantaneously in accordance with the parameter value stored in the current area 16a. However, because the operating amount of the electric fader 524 is represented by a physical position of the fader 524, the fader 524 is driven compulsorily so as to agree with the parameter value (fader gain). Such general behavior of the embodiment is similar to the general behavior of the conventionally-known digital mixers.

3.2. Initialization of the Crossfade:

Once the human operator performs predetermined operation, the respective settings of the channel number section 32, input device allocation section 34 and FADER mode designation section 35 are displayed on the flat panel display of the group of display devices and members 12, and a screen for editing any of the settings is also displayed on the flat panel display. Thus, by manipulating the keyboard and mouse on the screen, the human operator can designate any one of the input channels allocated to the input devices A, B and C and set a desired FADER mode (i.e., "FADER MODE ON" or "FADER MODE NO") for the input channel.

In addition, the human operator can set the fader gains of the individual input channels to optimal levels by operating the faders of the input channels while audio signals are being actually reproduced via the video tape recorders 106, 108 etc. Then, once the human operator performs predetermined operation after having set the fader gains to the optimal levels, the current fader gains of the corresponding faders are stored into the reference level designation section 38 as reference levels to be used in a crossfade process. However, the human operator can not edit the contents of the "CROSSFADE mode designation section" 36 and "AUTO mode designation section" 37, because the contents of the "CROSSFADE mode designation section" 36 are set in response to a control command subsequently supplied from the control apparatus 102 and the contents of the "AUTO mode designation section" 37 are set when the crossfade is to be actually carried out.

3.3 Setting of the CROSSFADE Mode:

For allowing the control apparatus 102 to instruct the digital mixer 112 to carry out a crossfade, it is necessary to designate in advance a CROSSFADE mode (i.e., "FROM", "TO" or "NONE") for each channel to be subjected to the crossfade. For the CROSSFADE mode designation, the following are predefined as control commands to be supplied from the control apparatus 102 to the digital mixer 112.

(1) FROM machine command: This is a command instructing that all of the input channels allocated to particular input devices be set to the CROSSFADE mode "FROM".

(2) FROM channel command: This is a command instructing that one or more desired input channels be set to the CROSSFADE mode "FROM".

(3) TO machine command: This is a command instructing that all of the input channels allocated to particular input devices be set to the CROSSFADE mode "TO".

(4) TO channel command: This is a command instructing that one or more desired input channels be set to the CROSSFADE mode "TO".

The following paragraphs set forth operations to be carried out when the above-mentioned commands are given from the control apparatus 102. However, every one of the above-mentioned commands is ignored if it has been received during execution of a crossfade. Therefore, only when no crossfade is being executed, these commands can be executed, and the CROSSFADE mode can be updated. How to determine whether a crossfade is being executed or not will be later described.

(1) FROM Machine Code:

Once the FROM machine command, designating any one of the input device A, B, C, . . . , is received from the control apparatus 102, the CPU 18 starts up a FROM machine command reception routine as shown in section of FIG. 5A. At step SP2 of FIG. 5A, the input device allocation section 34 of the setting information table 30 is referenced to detect all of the input channels allocated to the input device designated by the FROM machine command. Then, relevant portions of the CROSSFADE mode designation section 36 are updated so that the CROSSFADE mode of each of the thus-detected input channels is set to "FROM".

(2) FROM Channel Command:

Once the FROM channel command is received from the control apparatus 102, the CPU 18 starts up a FROM channel command reception routine as shown in section of FIG. 5B. Note that the FROM channel command includes channel designating data 40 as illustrated in FIG. 5C. The channel designating data 40 is intended to assign a one-bit mode designating flag to each of the input channels; that is, the mode designating flag at a value "1" instructs that the CROSSFADE mode of the corresponding input channel should be set to "FROM", while the mode designating flag at a value "0" instructs that the CROSSFADE mode of the corresponding input channel should not be set to "FROM". At next step SP12 of FIG. 5B, relevant portions of the CROSSFADE mode designation section 36 are updated so that the CROSSFADE mode of each of the input channels of which the mode designating flag is at "1" is set to "FROM".

At following step SP14 of FIG. 5B, those channels of which the current CROSSFADE mode is "FROM" are detected from among all of the input channels of which the mode designating flag is at "0". At next step SP16, a determination is made as to whether at least one channel has been detected at step SP14 above. If a NO determination is made as step SP16, the instant routine is immediately brought to an end. If, on the other hand, a YES determination is made at step SP16, the routine moves on to step SP18, where relevant portions of the CROSSFADE mode designation section 36 are updated so that the CROSSFADE mode of each of the detected channels (i.e., each of the input channels of which the mode designating flag is "0" and the CROSSFADE mode is "FROM") is set to "NONE".

(3) TO Machine Command:

Once the TO machine command designating any one of the input devices is received from the control apparatus 102, the CPU 18 starts up a TO machine command reception routine as shown in section of FIG. 6A. At step SP22 of FIG. 6A, the input device allocation section 34 of the setting information table 30 is referenced to detect all of the input channels allocated to the input device designated by the TO machine command. Then, relevant portions of the CROSSFADE mode designation section 36 are updated so that the CROSSFADE mode of all of the thus-detected input channels is set to "TO".

(4) TO Channel Command:

Once the TO channel command is received from the control apparatus 102, the CPU 18 starts up a TO channel command reception routine as shown in section of FIG. 6B. Note that the TO channel command includes a channel designating data 42 as illustrated in FIG. 6C. Similarly to the channel designating data 40 of the above-described FROM channel command, the channel designating data 42 is intended to assign a one-bit mode designating flag to each of the input channels. At next step SP32 of FIG. 6B, relevant portions of the CROSSFADE mode designation section 36 are updated so that the CROSSFADE mode of each of the input channels of which the mode designating flag is at "1" is set to "TO".

At following step SP34 of FIG. 6B, those channels of which the current CROSSFADE mode is "TO" are detected from among all of the input channels of which the mode designating flag is at "0". At next step SP36, a determination is made as to whether at least one channel has been detected at step SP34 above. If a NO determination is made as step SP36, the instant routine is immediately brought to an end. If, on the other hand, a YES determination is made as step SP36, the routine moves on to step SP38, where relevant portions of the CROSSFADE mode designation section 36 are updated so that the CROSSFADE mode of each of the detected channels (i.e., each of the input channels of which the mode designating flag is at "0" and the CROSSFADE mode is "TO") is set to "NONE".

3.4. Reception of Crossfade Start Command:

Once a crossfade start command, instructing the digital mixer 112 to execute a crossfade process, is received from the control apparatus 102, the CPU 18 determines whether a crossfade is being currently carried out. If so, the crossfade start command is ignored. If, on the other hand, no crossfade is being currently carried out, then a crossfade start command reception routine of FIG. 7 is started up.

Figure 7:
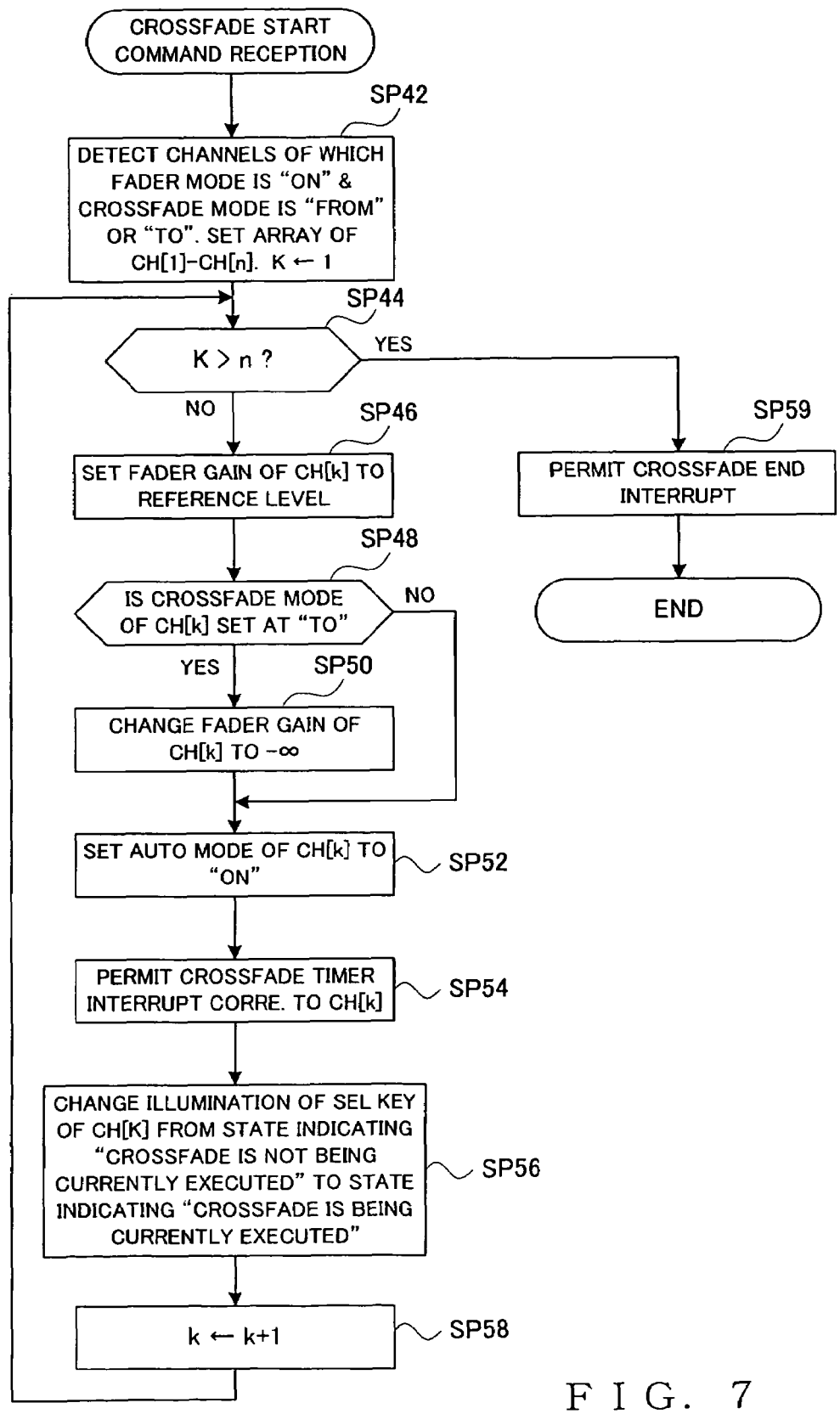
FIG. 7 is a flow chart of a crossfade start command reception routine performed in the embodiment.

At step SP42 of FIG. 7, the setting information table 30 is referenced to detect all of the input channels of which the FADER mode is "ON" and the CROSSFADE mode is "FROM" or "TO", and the number of the thus-detected input channels is assigned to a variable n. Also, the individual detected input channels are assigned to an array CH; namely, the constituent elements of the array CH are channels CH[1]-CH[n]. Further, a count variable k for counting the input channels is set at "1".

Then, at step SP44 of FIG. 7, a determination is made as to whether the count variable k has exceeded the number n of the channels. With a NO determination at step SP44, the routine goes to step SP46. At step SP46, the reference level of the channel CH[k] is read out from the reference level designation section 38, and the current area 16a is updated so that the fader gain of the channel CH[k] equals the reference level. Then, at step SP48, a determination is made as to whether the CROSSFADE mode of the channel CH[k] is currently set at "TO". If a YES determination is made at step S48, the routine moves on to step SP50, where the current area 16a is updated so that the fader gain of the channel CH[k] takes a lowest level "-∞".

Eventually, the fader gain is set at the reference level when the CROSSFADE mode is "FROM", but set at the lowest level "-∞" when the CROSSFADE mode is "TO". In this way, the corresponding electric fader 524 is driven to automatically move to a position corresponding to the fader gain. Upon completion of the movement of the electric fader 524, the AUTO mode of the channel CH[k] is set at "ON". Then, at step SP54, a crossfade timer interrupt corresponding to the channel CH[k] is permitted.

The "crossfade timer interrupt" is an interrupt which is generated every predetermined time (i.e., every crossfade timer interrupt period) during execution of the crossfade and per input channel for which the interrupt is permitted and which is intended to gradually vary the fader gain of the input channel. Whether or not the crossfade timer interrupt should be permitted is set per channel; in this instance, the crossfade timer interrupt is permitted only for the channel CH[k]. The crossfade start command, received from the control apparatus 102, also designates a crossfade execution time (length) from the start to end of the crossfade. Therefore, by dividing the crossfade execution time by the crossfade timer interrupt period, it is possible to obtain the number of interrupts generated within the crossfade execution time.

Further, in each channel of which the CROSSFADE mode is "FROM", the fader gain at the start of the crossfade is at the reference level, while the fader gain at the end of the crossfade is at the lowest level "-∞". Conversely, in each channel of which the CROSSFADE mode is "TO", the fader gain at the start of the crossfade is at the lowest level "-∞", while the fader gain at the end of the crossfade is at the reference level. In either case, it is possible to determine a variation amount of the fader gain per crossfade timer interrupt, by subtracting the "fader gain at the start of the crossfade" from the "fader gain at the end of the crossfade" and then dividing the subtraction result (i.e., difference) by the "number of interrupts generated". Thus, at step SP54, such a variation amount of the fader gain is calculated for the channel CH[k].

At step SP56, the LED 516a built in the SEL key 516 of the channel CH[k] is changed from a state indicating "crossfade is not being currently executed" over to a state indicating "crossfade is being currently executed". Details of the illumination state of the LED are explained with reference to FIG. 10. When "crossfade is not being currently executed", the SEL key of each channel of which the FADER mode is "OFF" is deilluminated, but the SEL key of each channel of which the FADER mode is "ON" is illuminated continuously in a particular color corresponding to the CROSSFADE mode; for example, if the CROSSFADE mode is "FROM", the SEL key is continuously illuminated in red, if the CROSSFADE mode is "TO", the SEL key is continuously illuminated in orange, or if the CROSSFADE mode is "NONE", the SEL key is continuously illuminated in green.

Further, when "crossfade is being currently executed", the SEL key of each channel of which the FADER mode is "OFF" and the SEL key for each channel which the FADER mode is "ON" and the CROSSFADE mode is "NONE" are placed in the same illumination state as when "crossfade is not being currently executed". However, if the FADER mode is "ON" and the CROSSFADE mode is "FROM" or "TO", then the SEL key 516 is set in a blinking state. More specifically, if the CROSSFADE mode is "FROM", the SEL key is blinked in red, if the CROSSFADE mode is "TO", the SEL key is blinked in orange. In this way, each fader that is being actually driven can be informed to the human operator or user by the blinking of the built-in LED of the SEL key 516.

Referring back to FIG. 7, the count variable k is incremented by one at step SP58 and then the routine reverts to step SP44, so that the operations at and after step S44 are repeated for all of the channels CH[1]-CH[n]. When the operations have been performed for all of the channels, a YES determination is made at step SP44 so that the routine goes to step SP59, where a crossfade end interrupt is permitted. The "crossfade end interrupt" is an interrupt which is generated every predetermined time (i.e., every crossfade end interrupt period) during execution of the crossfade and which is intended to determine whether the crossfade execution time has passed.

Figure 8A:
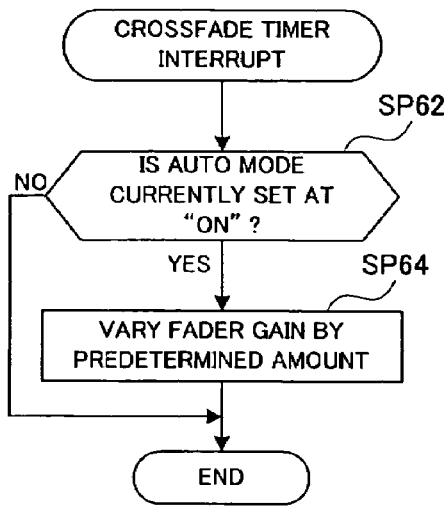
FIG. 8A is a flow chart of a crossfade timer interrupt routine performed in the embodiment.

3.5. Crossfade Timer Interrupt Process:

If the "crossfade timer interrupt" has been permitted at step SP54 as noted above, the crossfade timer interrupt is generated per crossfade timer interrupt period and per channel for which the interrupt has been permitted. In response to generation of the crossfade timer interrupt, a crossfade timer interrupt routine of FIG. 8A is started up. At step SP62 of FIG. 8A, a determination is made as to whether or not the AUTO mode of the input channel to be subjected to the current interrupt process is currently "ON". With a NO determination at step SP62, the instant routine is brought to an end without any substantial operation being carried out. If, on the other hand, a YES determination is made at step SP62, the routine moves on to step SP64, where the fader gain (i.e., fader gain value stored in the current area 16a and position of the fader corresponding to the channel) is varied by the variation amount calculated earlier for the input channel at step SP54. Thus, by the instant routine being called per crossfade timer interrupt period, the fader gain of each channel of which the AUTO mode is "ON" is updated progressively, by the calculated variation amount at a time, from the fader gain at the start of the crossfade toward the fader gain at the end of the crossfade, in accordance with which the fader is automatically driven in a progressive manner.

Figure 8B:
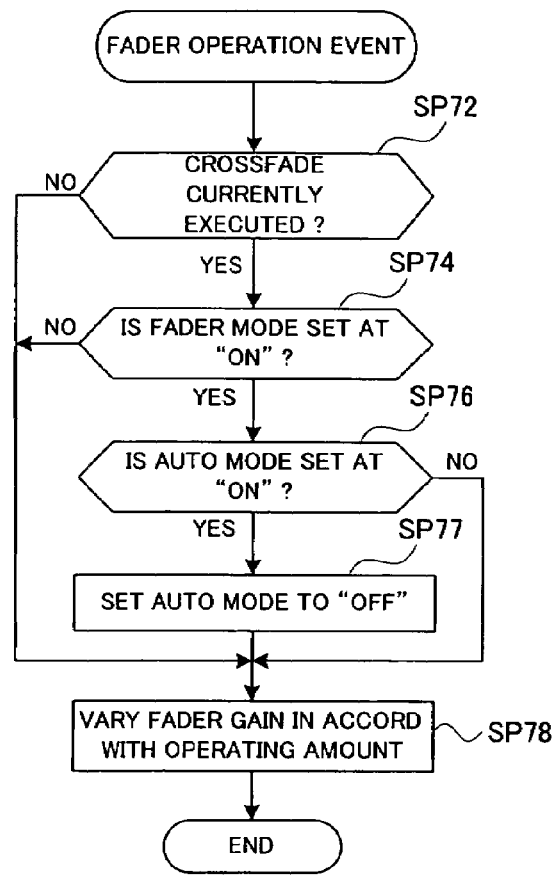
FIG. 8B is a flow chart of a fader operation event routine performed in the embodiment.

3.6. Fader Operation Event Process:

Once the fader of any one of the input channels has been manually operated by the human operator, the manual operation of the fader is detected by the CPU 18, and a fader operation event process routine of FIG. 8B is started up. This routine is started up in response to manual operation of the fader of any one of the input channels, irrespective of whether crossfade is being currently executed or not. At step SP72 of FIG. 8B, a determination is made as to whether crossfade is being currently executed. That "crossfade is being currently executed" means a state after reception of the crossfade start command from the control apparatus 102 but before inhibition of the crossfade end interrupt. If a YES determination is made at step SP72, the routine moves on to step SP74, where it is further determined whether the FADER mode of the input channel corresponding to the operated fader is currently "ON".

With a YES determination at step SP74, the routine proceeds to step SP76, where a further determination is made as to whether the AUTO mode of the input channel is currently "ON". If a YES determination is made at step SP76, the routine moves on to step SP77, where the AUTO mode is set to "OFF". Then, at step SP78, a corresponding portion of the current area 16a is updated in such a manner that the fader gain of the channel equals the actual operating amount (current position) of the fader.

After the AUTO mode has been set to "OFF", a NO determination is made at step SP62 above when the crossfade timer interrupt routine of FIG. 8A is called, so that the fader gain of the input channel will not be automatically updated until the current execution of crossfade is completed. Stated differently, if the human operator has manually operated any of the crossfade-related faders during the execution of crossfade, the operated fader is to be excluded from the crossfade until the current crossfade execution is completed. However, once a new crossfade execution instruction, designating the input channel in question, is received after completion of the current crossfade execution, the operation at step SP52 above (see FIG. 7) is again carried out, and thus, the AUTO mode of that input channel is again set to "ON" so that the fader of the input channel will be automatically driven.

If a NO determination has been made at any one of steps SP72, SP74 and S76 above, the routine jumps over step S77 to step SP78. Namely, when no crossfade is being executed and if the FADER mode is "OFF" or the AUTO mode is "OFF", it is only necessary that the corresponding portion of the current area 16a be updated, because the input channel corresponding to the operated fader is not an object of crossfade.

Figure 8C:
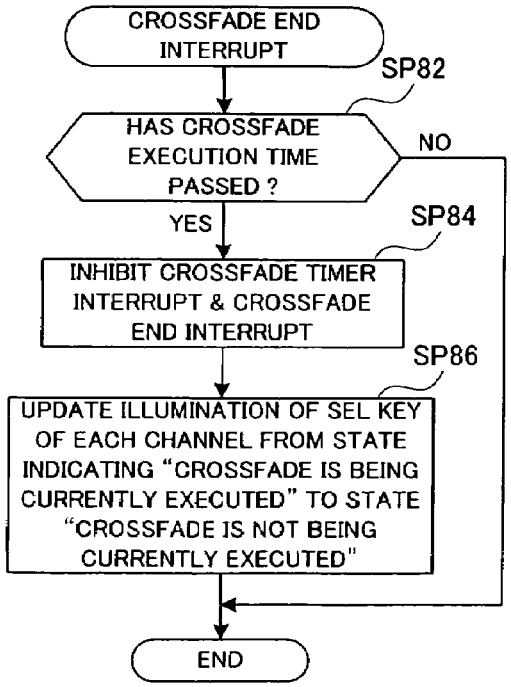
FIG. 8C is a flow chart of a crossfade end interrupt routine performed in the embodiment.

3.7. Crossfade End Interrupt Process:

Once a crossfade end interrupt is permitted at step SP59 above (see FIG. 7), a crossfade end interrupt routine of FIG. 8C is started up every crossfade end interrupt period. At step SP82 of FIG. 8C, a determination is made as to whether the crossfade execution time has passed after the start of the crossfade (i.e., after execution of step SP59). With a NO determination at step SP59, the instant routine is immediately brought to an end.

If, on the other hand, the crossfade execution time has passed as determined at step SP82 (YES determination at step SP82), the routine moves on to step SP84, where the crossfade timer interrupt of FIG. 8A and crossfade end interrupt (FIG. 8C) are inhibited. At next step SP86, the illumination of the SEL key of each of the input channels is changed from the state indicating "crossfade is being currently executed" (section (b) of FIG. 10) over to the state indicating "crossfade is not being currently executed" (section (a) of FIG. 10).

Figure 9:
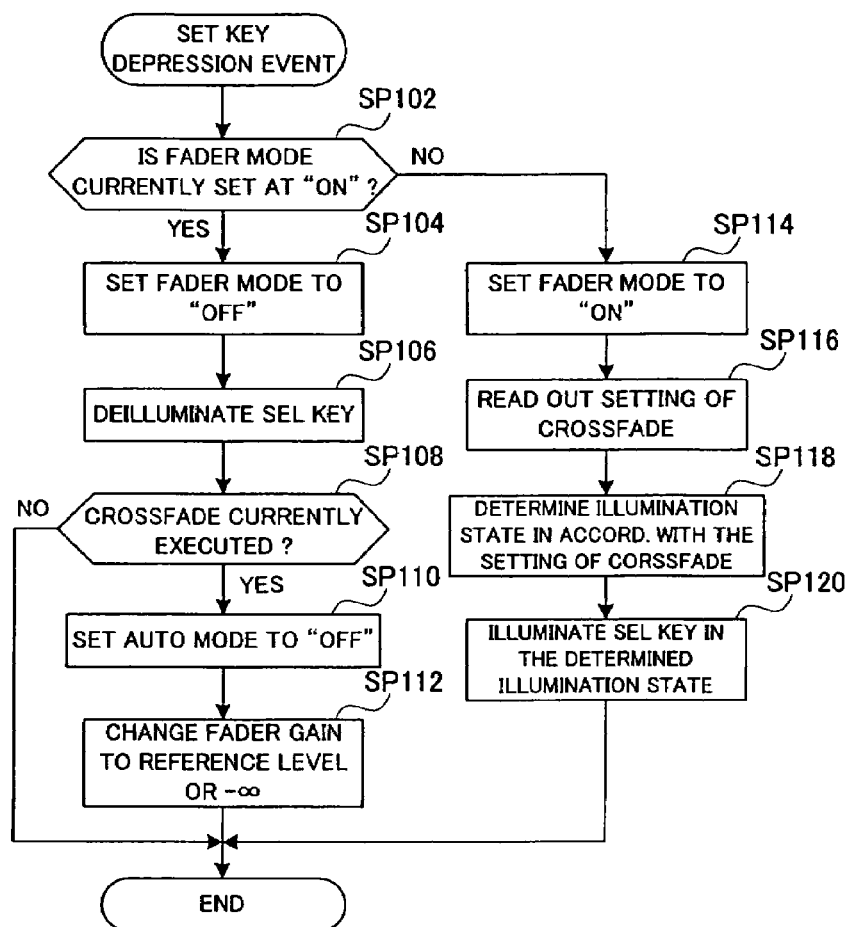
FIG. 9 is a flow chart of a SEL key depression event process routine performed in the embodiment.

3.8. SEL Key Depression Event Process:

Once the SEL key 516 of any one of the input channels has been depressed by the human operator, a SEL Key depression event process routine of FIG. 9 is started up, irrespective of whether crossfade is being currently executed or not. At step SP102, it is determined whether the FADER mode of the input channel is "ON". If the FADER mode is "OFF" (NO determination at step SP102), the routine branches to step SP114, where the FADER mode is set to "ON". At next step SP116, the setting of the CROSSFADE mode of the input channel is read out from the setting information mode 30. At following step SP118, the illumination state of the SEL key is determined in accordance with the read-out setting of the CROSSFADE mode. The illumination state of the SEL key determined here is any one of several examples illustrated in section (a) of FIG. 10.

If, on the other hand, the FADER mode has already been set at "ON" at the time of the depression of the SEL key 516, a YES determination is made at step SP102 and the routine moves on to step SP104, where the FADER mode is set to "OFF". At following step SP106, the SEL key is deilluminated in accordance with the new FADER mode (i.e., "FADER MODE OFF"). At next step SP108, a determination is made whether or not a crossfade is being executed. With a YES determination at step SP108, the routine goes to step SP110, where the AUTO mode of the input channel is set to "OFF".

Thus, even when the crossfade timer interrupt routine of FIG. 8A is thereafter started up for the input channel, the fader gain of the input channel will not be varied by the crossfade timer interrupt routine. At step SP112, the fader gain of the input channel is updated to equal a fader gain before the execution of the crossfade. Here, the "fader gain before the execution of the crossfade" is the reference level in the case where the CROSSFADE mode of the channel is "FROM", but the lowest level "-∞" in the case where the CROSSFADE mode of the channel is "TO". In this way, the corresponding electric fader is automatically driven to a position corresponding to the new fader gain.

Namely, with the above-described embodiment, it is possible to select, as an approach to cease the crossfade for a particular input channel during execution of the crossfade, any one of (1) the approach of operating the fader of the input channel (see FIG. 8B) and (2) the approach of depressing the SEL key of the input channel (see FIG. 9). The first-mentioned approach (i.e., item (1) approach) is useful if used when only the currently-executed crossfade is to be ceased and the fader gain is to be updated through manual operation by the human operator. The second-mentioned approach (i.e., item (2) approach) is useful if used when the input channel in question should be excluded from the current crossfade process but also a subsequent crossfade process.

4. Modification:

It should be appreciated that the present invention is not limited to the above-described embodiment and may be modified variously as stated below merely by way of example.

(1) Whereas the embodiment has been described as applied to a digital mixer, the present invention is of course applicable to analog mixers having attenuators directly connected to faders. Further, the present invention can be applied to a variety of other tone volume adjustment apparatus than mixers.

Figure 10:
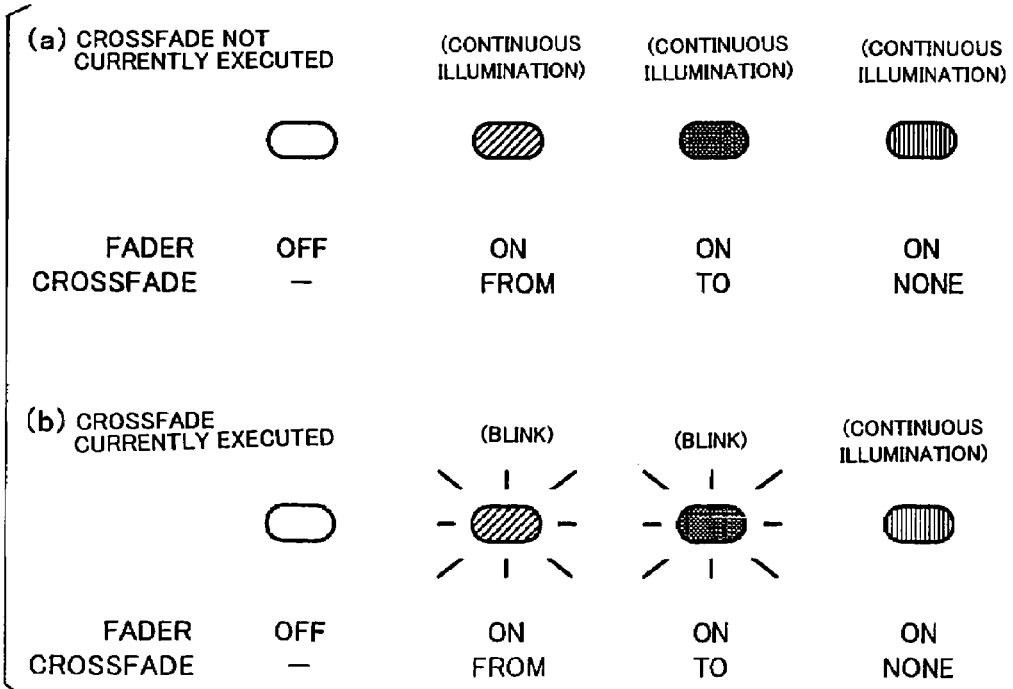
FIG. 10 is a diagram explanatory of various illumination states of an LED built in the SEL key.

(2) The above-described embodiment is arranged such that the ON/OFF states of the FADER mode and CROSSFADE mode of each channel when the FADER mode is "ON" are informed to the human operator by the variable illumination state of the LED built in the SEL key as illustrated in FIG. 10. However, the manner of illuminating the LED built in the SEL is not limited to that in the described embodiment. Furthermore, such operation modes may be informed by any other display means than the LED built in the SEL key; for example, there may be employed visual, audible and touchable display means, such as character displays, shape displays and sound displays.

(3) Further, the above-described embodiment is arranged such that the FADER mode and CROSSFADE mode are informed to the human operator irrespective of whether a crossfade is being executed or not. Alternatively, arrangements may be made such that the FADER mode and CROSSFADE mode are not informed prior to execution of the crossfade process but informed only when necessary, e.g. when the crossfade process has been started.

(4) Furthermore, in the above-described embodiment, the FADER mode and CROSSFADE mode are informed to the human operator for all input channels that are to be subjected to the crossfade process. However, these modes need not necessarily be informed concurrently for all of the input channels; the modes may be informed for only a certain one or ones of the channels designated by the human operator.

(5) Furthermore, at steps SP118 and SP120 in the above-described embodiment, the SEL key of an input channel where the FADER mode has been newly set to "ON" is illuminated to indicate that "crossfade is not being currently executed" (see section (a) of FIG. 10). In an alternative, however, the SEL key may be illuminated to indicate that "crossfade is being currently executed".

(6) Furthermore, step SP112 in the above-described embodiment is arranged such that, when the FADER mode has been set to OFF during execution of a crossfade, the fader gain of the corresponding input channel is set to either the reference level or the lowest level "-∞". However, alternative arrangements may be made such that the current fader gain values of the individual input channels at a time point when the crossfade start command reception routine of FIG. 7 has been carried out may be stored into the RAM 116 so that the thus-stored fader gain values are set at step S112.

(7) Furthermore, in the above-described embodiment, fader gain values of the individual faders at the time of crossfade initialization are stored during the initialization, as crossfade reference levels, into the reference level designation section 38. However, in cases where the crossfade is to be executed only once, such crossfade reference levels need not necessarily be set during the initialization and may be set in response to reception of a crossfade start command. Specifically, the operation at step SP46 (FIG. 7) in the above-described embodiment may be replaced with an operation for writing the current fader gain value of the channel CH[k] into a portion, corresponding to the channel CH[k], of the reference level designation section 38. In this case, at step SP112 of FIG. 9, the fader gain is updated with the value thus written in the reference level designation section 38.

(8) Furthermore, whereas the described embodiment is arranged to perform the various processes by programs executed by the CPU 18. Such programs alone may be stored and distributed in a recording medium, such as a CD-ROM or flexible disk, or distributed through a communication path.

What is claimed is:

1. A signal level adjustment apparatus comprising:
   a plurality of level adjusting operators each operable manually or automatically to adjust a signal level of any one of a plurality of channels;
   a crossfade execution section that, upon receipt of a crossfade execution instruction, automatically operates a corresponding one of said operators in such a manner that the signal level of one of at least two channels among the plurality of channels is faded in and the signal level of the other of the at least two channels is faded out;
   a detection section that detects that a crossfade cease instruction has been given for any one of the channels when any one of the operators corresponding to the one channel is manually operated while a fade-in or fade-out process is being executed for the one channel by said crossfade execution section; and
   a cease control section that, when the crossfade cease instruction for the one channel has been detected by said detection section, ceases the fade-in or fade-out process only for the one channel of said at least two channels where the fade-in or fade-out process is executed by said crossfade execution section,
   wherein the signal level of the one channel where the fade-in or fade-out process has been ceased is no longer automatically updated by the crossfade execution section and is updated, after the cease of the fade-in or fade-out process, in response to manual operation of the operator corresponding to the one channel.

2. A signal level adjustment apparatus as claimed in claim 1, further comprises a detection section that detects whether a predetermined crossfade inhibition instruction has been given for any one of the channels while a fade-in or fade-out process is being executed for the one channel by said crossfade execution section, and
   wherein, concerning any one of the channels for which the predetermined crossfade cease instruction has been given, said crossfade execution section executes the fade-in or fade-out process when a new crossfade execution instruction is given later, and
   wherein, concerning any one of the channels for which the predetermined crossfade inhibition instruction has been given, said crossfade execution section does not execute the fade-in or fade-out process even when a crossfade execution instruction is given, until the crossfade inhibition is canceled later.

3. A signal level adjustment apparatus as claimed in claim 1, which further comprises:
   an information presentation section that, for each of the channels, presents crossfade mode information indicating which one of the fade-in and fade-out is to be executed; and
   an informing device that informs the fade operation mode and crossfade mode information of each of the channels, wherein said informing device is positioned in association with said operators of individual ones of the channels.

4. A control method for a signal level adjustment apparatus, said signal level adjustment apparatus including a plurality of level adjusting operators each operable manually or automatically to adjust a signal level of any one of a plurality of channels, said control method comprising:
   a crossfade execution step of, upon receipt of a crossfade execution instruction, automatically operating a corresponding one of said operators in such a manner that the signal level of one of the at least two channels among the plurality of channels is faded in and the signal level of other of the at least two channels is faded out;
   a detection step of detecting that a crossfade cease instruction has been given for any one of the channels when any one of the operators corresponding to the one channel is manually operated while a fade-in or fade-out process is being executed for the one channel by said crossfade execution step; and
   a cease control step of when the crossfade cease instruction for the one channel has been detected by said detection step, ceasing the fade-in or fade-out process only for the one channel of said at least two channels where the fade-in or fade-out process is being executed by said crossfade execution section,
   wherein the signal level of the one channel where the fade-in or fade-out process has been ceased is no longer automatically updated by the crossfade execution section and is updated, after the cease of the fade-in or fade-out process, in response to manual operation of the operator corresponding to the one channel.

* * * * *